(12) United States Patent
Wloka et al.

(10) Patent No.: US 7,468,726 B1
(45) Date of Patent: Dec. 23, 2008

(54) CULLING IN A VERTEX PROCESSING UNIT

(75) Inventors: Matthias M. Wloka, San Jose, CA (US); Douglas Sim Dietrich, Jr., Los Gatos, CA (US)

(73) Assignee: Nvidia Corporation, Santa Clara, CA (US)

( * ) Notice: Subject to any disclaimer, the term of this patent is extended or adjusted under 35 U.S.C. 154(b) by 25 days.

(21) Appl. No.: 11/293,876

(22) Filed: Dec. 1, 2005

(51) Int. Cl.
*G06T 15/40* (2006.01)
(52) U.S. Cl. ..................... 345/421; 345/419
(58) Field of Classification Search ............. None
See application file for complete search history.

(56) References Cited
U.S. PATENT DOCUMENTS
2004/0196281 A1* 10/2004 Huang .................. 345/419
2005/0091616 A1* 4/2005 Wang et al. ............ 715/864
2006/0152509 A1* 7/2006 Heirich .................. 345/426
2006/0164414 A1* 7/2006 Farinelli ................ 345/422

\* cited by examiner

*Primary Examiner*—Ulka Chauhan
*Assistant Examiner*—Daniel F Hajnik
(74) *Attorney, Agent, or Firm*—Townsend and Townsend and Crew, LLP

(57) ABSTRACT

A graphics processor performs culling of invisible primitives in a vertex processing unit that includes a geometry shader or other processing engine that performs per-primitive operations. Primitives can be culled after clip space coordinates for the vertices have been computed and in some instances before at least one other vertex attribute has been computed. To the extent that this early culling reduces the number of vertices for which the full set of attributes is computed or reduces the number of primitives or vertices delivered to downstream units, throughput of the processor is increased.

19 Claims, 5 Drawing Sheets

CULLING IN A VERTEX PROCESSING UNIT

BACKGROUND OF THE INVENTION

The present invention relates in general to computer graphics, and in particular to culling of invisible primitives in a vertex processing unit.

Many computer generated images are created by mathematically modeling the interaction of light with a three-dimensional (3D) scene from a given viewpoint and projecting the result onto a two-dimensional (2D) "screen." This process, called rendering, generates a 2D image of the scene from the given viewpoint and is analogous to taking a digital photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general-purpose central processing unit (CPU) and a graphics processing subsystem. Typically, the CPU performs high-level operations, such as determining the position, motion, and collision of objects in a given scene. From these high-level operations, the CPU generates a set of rendering commands and data defining the desired rendered image (or images). For example, rendering commands and data can define scene geometry by reference to "primitives," which are usually points, lines triangles or other simple polygons; complex objects are defined as groups of primitives. A primitive is typically defined as a group of vertices, with each vertex having attributes such as color, world space coordinates, texture-map coordinates, and the like, and the same vertex may be part of multiple primitives. Rendering commands and data can also define other parameters for a scene, such as lighting, shading, textures, motion, and/or camera position. From the set of rendering commands and data, the graphics processing subsystem creates one or more rendered images.

Graphics processing subsystems typically use a stream, or pipeline, processing model, in which input elements are read and operated on successively by a chain of processing units. The output of one processing unit is the input to the next processing unit in the chain. A typical pipeline includes vertex processors, which generate attribute values for the 2D or 3D vertices; setup processors, which create parameterized attribute equations for all points in each primitive; rasterizers, which determine which particular pixels or sub-pixels (also referred to herein as fragments) are covered by a given primitive; and fragment processors, which determine the color and other attributes of each fragment based in part on the parameterized attribute equations created by the setup processor. Typically, data flows only one way, "downstream," through the chain of units, although some processing units may be operable in a "multi-pass" mode, in which data that has already been processed by a given processing unit can be returned to that unit for additional processing.

Typically, the rendering commands and data sent to the graphics processing subsystem define a set of primitives that might or might not be visible in the final rendered image. To improve performance, the graphics processing subsystem or the CPU can perform one or more visibility tests to determine the potential visibility of primitives. For instance, primitives that are behind the viewpoint, too small, too distant, or oriented away from the viewpoint are generally identified as invisible using well-known tests. The graphics processing subsystem or the CPU can remove, or cull, primitives that fail the visibility test from the set of potentially visible geometric primitives, thereby reducing the number of primitives to be rendered.

Visibility testing and culling of primitives, referred to as culling operations, are performed in the setup processors and/or rasterizers of conventional graphics processing subsystems. This approach, however, is inadequate in at least some situations. As rendered scenes become more complex, they typically include a larger number of primitives and therefore a larger number of vertices. Processing bottlenecks can occur, for instance, if the graphics subsystem does not provide sufficient bandwidth to communicate all of the vertices and their associated attributes from the vertex processing unit to the setup unit. In addition, as rendering techniques become increasingly sophisticated, the number of attributes associated with each vertex tends to increase, as does the complexity of the computations used to generate attribute values for each vertex. Thus, processing bottlenecks can also occur within a vertex processing unit, where considerable processing power can be spent computing attributes for vertices that are not part of any visible primitive and therefore have no effect on the final image.

In some computer systems, these bottlenecks have been partially alleviated by moving some of the culling operations from the graphics subsystem into the CPU. For instance, the CPU can perform "backface" culling, which involves identifying and culling primitives that face away from the viewpoint and are therefore not visible. Such culling can be performed by a graphics driver or other suitable program executing on the CPU. When the CPU culls a primitive, an instruction to process that primitive is not sent to the graphics subsystem, reducing the burden on the graphics subsystem. In instances where the processing bottlenecks in the graphics subsystem result in idle time in the CPU, culling in the CPU can improve overall system performance.

Nonetheless, CPU culling is at best a partial solution. While some types of culling can be handled by the CPU, many culling operations are handled more efficiently within the graphics subsystem. Further, culling in the CPU can divert CPU cycles from high-level rendering operations, processing of user input, and the like, which can impair overall system performance.

It is therefore desirable to perform culling operations in the graphics subsystem rather than in the CPU. It is further desirable to cull as early as possible in the graphics pipeline, in order to decrease wasteful rendering operations, reduce the bandwidth requirements for communicating vertices and associated attributes, and improve rendering performance.

BRIEF SUMMARY OF THE INVENTION

Embodiments of the present invention provide culling of primitives within the vertex processing unit of a graphics processor. In some embodiments, culling is performed using a processing engine (e.g., a geometry shader) within the vertex processing unit that is capable of performing per-primitive operations. In one embodiment, the primitive processing engine culls primitives after clip space coordinates for the vertices have been computed but before at least one other vertex attribute has been computed. To the extent that culling reduces the number of vertices for which attributes other than clip space coordinates are computed, the throughput of the vertex processing unit is advantageously increased. In addition, to the extent that primitives are culled in the vertex processing unit, fewer vertices or primitives are delivered to the next downstream processing unit, thereby further improving throughput of the graphics processor.

According to one aspect of the present invention, a graphics processor includes a vertex processing unit and a downstream processing unit. The vertex processing unit is coupled to receive data for vertices, each vertex being associated with at least one of a number of primitives in a scene to be rendered. The vertex processing unit is configured to apply a visibility test to each of the plurality of primitives and to cull primitives that fail the visibility test from a list of primitives to be processed. In some embodiments, the vertex processing unit is also configured to compute at least one per vertex attribute value for each vertex that is associated with at least one primitive that is not culled. The downstream processing unit is coupled to receive the primitives that are not culled from the vertex processing unit and is configured to generate pixel data from the received primitives. Vertices of primitives that fail the visibility test are advantageously not received by the downstream processing unit.

In some embodiments, the vertex processing unit includes a vertex shader and a primitive processing engine. The vertex shader, which might be programmable, is configured to compute one or more per vertex attribute values for a vertex. The primitive processing engine, which might be, e.g., a programmable geometry shader, is configured to apply the visibility test and to cull each of the primitives that fails the visibility test from the list of primitives to be processed.

Various visibility tests may be implemented, and a vertex shader can be used to compute attributes used in a visibility test. For instance, the visibility test can be defined by reference to clip space coordinates of vertices of a primitive, and the vertex shader can be programmed or configured to compute clip space coordinates for the vertices during a first pass. Optionally, the vertex shader can also be programmed or configured to compute at least one other per vertex attribute value during a second pass that advantageously occurs after primitives that fail the visibility test are culled.

According to another aspect of the present invention, a method of processing vertex data is provided. A vertex processing unit of a graphics processor receives vertex data for a plurality of vertices, each vertex being associated with at least one of a plurality of primitives in a scene to be rendered. The vertex processing unit applies a visibility test to each of the plurality of primitives and culls each primitive that fails the visibility test. The vertices of each primitive that is not culled during the act of culling are propagated from the vertex processing unit to a downstream processing unit of the graphics processor. In some embodiments, subsequently to culling and prior to propagating the vertices of a primitive that is not culled, the vertex processing unit also computes at least one per vertex attribute value for each vertex that is associated with a primitive that is not culled.

Computing the clip space coordinates and computing the attribute value can be performed, e.g., by a programmable vertex shader in the vertex processing unit, while applying the visibility test and culling each primitive that fails the visibility test can be performed by a programmable geometry shader or other primitive processing engine in the vertex processing unit.

Various types of visibility tests can be defined. For instance, a visibility test can be based at least in part on a view frustum defined in the clip space and/or an orientation of the primitive in the clip space and/or a signed area of the primitive in the clip space coordinates. Further, in some embodiments, the downstream processing unit performs a further culling operation on each primitive propagated from the vertex processing unit.

The following detailed description together with the accompanying drawings will provide a better understanding of the nature and advantages of the present invention.

DETAILED DESCRIPTION OF THE INVENTION

Embodiments of the present invention provide culling of primitives within the vertex processing unit of a graphics processor. In some embodiments, culling is performed using a processing engine (e.g., a geometry shader) within the vertex processing unit that is capable of performing per-primitive operations. In one embodiment, the primitive processing engine culls primitives after clip space coordinates for the vertices have been computed but before at least one other vertex attribute has been computed. To the extent that culling reduces the number of vertices for which attributes other than clip space coordinates are computed, the throughput of the vertex processing unit is advantageously increased. In addition, to the extent that primitives are culled in the vertex processing unit, fewer vertices or primitives are delivered to the next downstream processing unit, thereby further improving throughput of the graphics processor.

Figure 1:
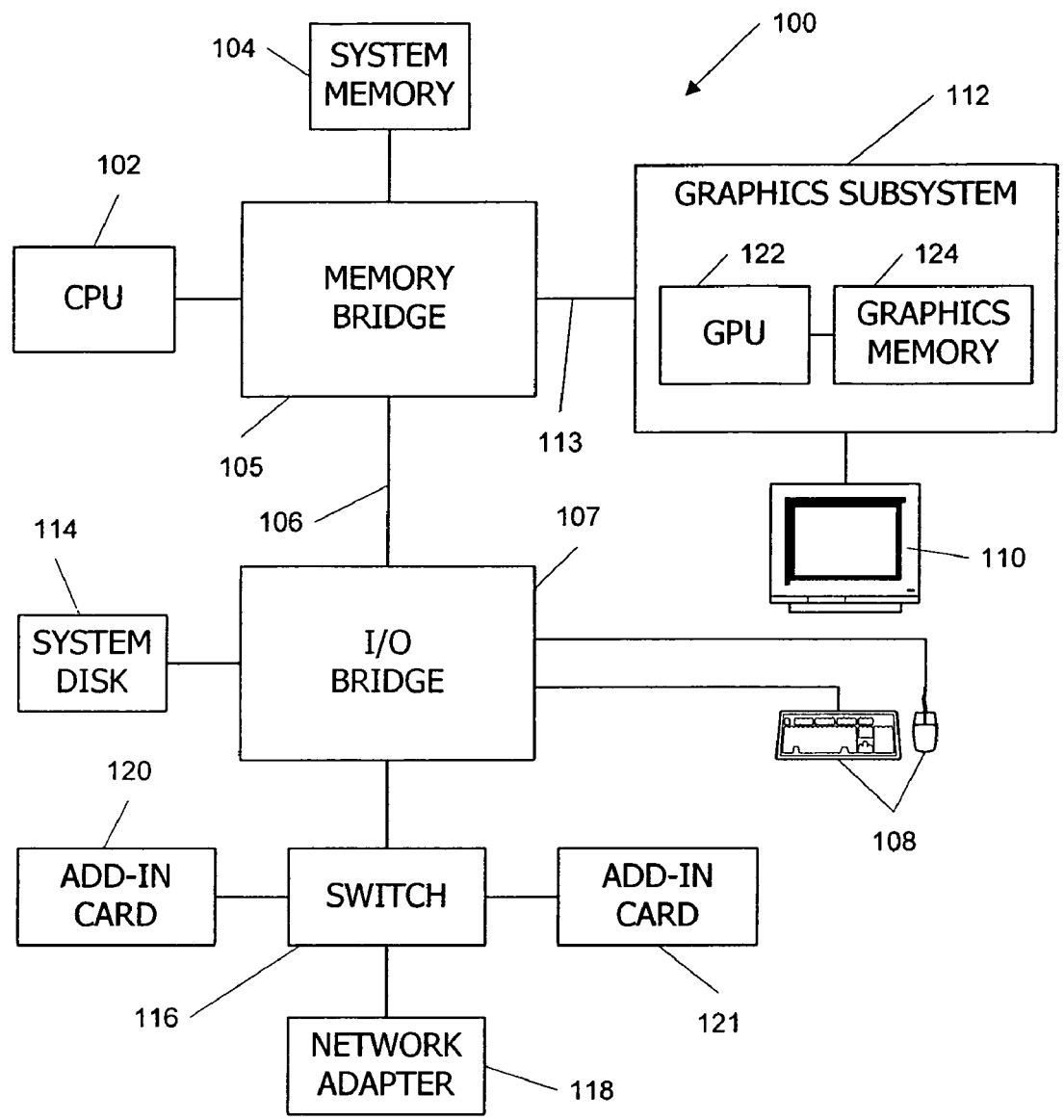
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105 is connected via a bus path 106 to an I/O (input/output) bridge 107. I/O bridge 107 receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus 113. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI Express (PCI-E), AGP (Advanced Graphics Processing), Hypertransport, or any other bus protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 also includes a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, a graphics driver program executing on CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, little or no dedicated graphics memory is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

GPUs may also be used for purposes other than rendering images. In some embodiments, a GPU can be used for general-purpose computing applications, which might or might not be related to computer-generated images. In general-purpose computing, the GPU can be configured to process data and return the results to the CPU or system memory rather than scanning out the results to display an image.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Figure 2:
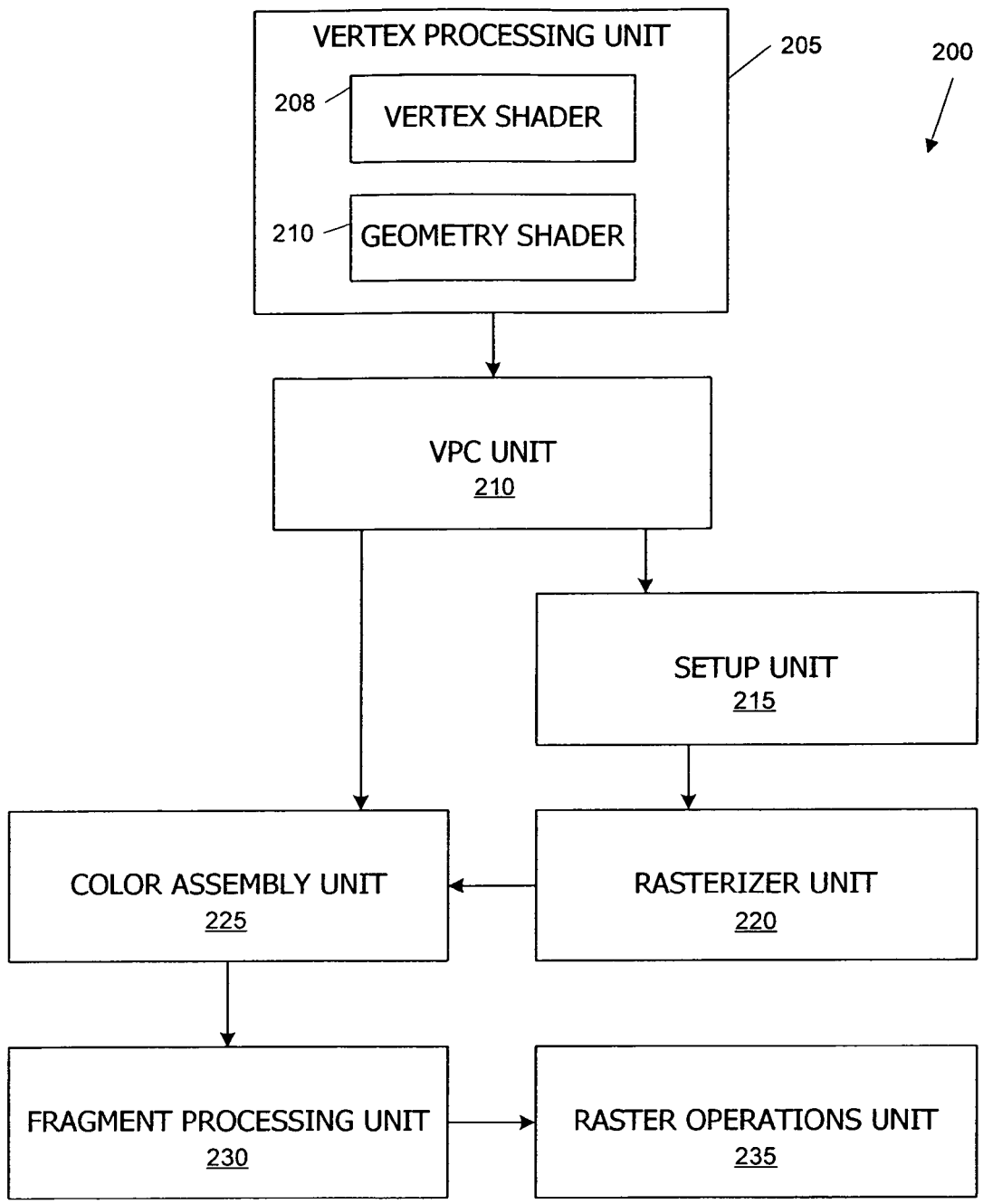
FIG. 2 is a block diagram of a rendering pipeline of a graphics processing subsystem according to an embodiment of the invention.

FIG. 2 is a block diagram of a rendering pipeline 200 of a graphics processing subsystem according to an embodiment of the invention. Pipeline 200 may be implemented in GPU 112 of FIG. 1 or any other graphics processor. Pipeline 200 includes a vertex processing unit 205, a viewport and culling (VPC) unit 210, a setup unit 215, a rasterizer unit 220, a color assembly unit 225, and a fragment processing unit 230.

Vertex processing unit 205 receives rendering commands and data used to define the desired rendered image or images, including geometry, lighting, shading, texture, motion, and/or camera parameters for a scene. In one embodiment, the geometry data includes a number of object definitions for objects (e.g., a table, a chair, a person or animal) that may be present in the scene. Objects are advantageously modeled as groups of primitives (e.g., points, lines, triangles and/or other polygons) that are defined by reference to their vertices. For each vertex, a position is specified in an object coordinate system, representing the position of the vertex relative to the object being modeled. In addition to a position, each vertex also has various other attributes associated with it. In general, attributes of a vertex may include any property that is specified on a per-vertex basis; for instance, in some embodiments, the vertex attributes include scalar or vector attributes used to determine qualities such as the color, texture, transparency, lighting, shading, and animation of the vertex and its associated geometric primitives.

Primitives, as already noted, are generally defined by reference to their vertices, and it should be understood that a single vertex can be included in any number of primitives. In some embodiments, each vertex is assigned an index (which may be any unique identifier), and a primitive is defined by providing an ordered list of indices for the vertices making up that primitive. Other techniques for defining primitives (including conventional techniques such as triangle strips or fans) may also be used.

Vertex processing unit 205 includes a vertex shader 208 that executes one or more vertex programs on each vertex to create a transformed vertex. Vertex shader 208 is advantageously programmable, and rendering applications can specify the vertex program to be used for any given set of vertices. In some embodiments, vertex shader 208 is configurable for multi-pass operation, in which a vertex can be processed multiple times by vertex shader 208, with different processing operations being performed during each pass. The vertex program determines the number of passes and the operations to be performed during each pass.

In a simple embodiment, a vertex program transforms a vertex from its 3D object coordinate system to a 3D "clip space" (or world space) coordinate system. This transformation defines the relative positions of different objects in the scene. In one embodiment, the transformation can be programmed by including, in the rendering commands and/or data defining each object, a transformation matrix for converting from the object coordinate system of that object to clip space coordinates. Vertex shader 208 applies this transformation matrix to each vertex of the primitives making up an object. In some embodiments, the clip space coordinates are specified as 3D homogeneous coordinates (x, y, z, w). The origin of the clip space coordinate system is advantageously defined to coincide with the viewpoint for the rendered image, the z axis to coincide with the view direction, and they axis to coincide with an "up" vector. The w axis is defined such that points with w>0 are in front of the viewpoint; points with w<0 are behind the viewpoint. In other embodiments, other coordinate systems may also be used and the present invention is not limited to a particular coordinate system.

More complex vertex programs can be used to implement a variety of visual effects, including lighting and shading, procedural geometry, and animation operations. Numerous examples of such "per-vertex" operations are known in the art, and a detailed description is omitted as not being critical to understanding the present invention. Vertex shader programs can implement algorithms using a wide range of mathematical and logical operations on vertices and other data, and the programs can include conditional or branching execution paths and direct and indirect memory accesses. In some embodiments of the present invention, vertex shader 208 is configured for multi-pass operation; for instance, the vertex program can transform the vertex to clip space coordinates during a first pass and perform all other per-vertex operations during one or more subsequent passes.

Vertex processing unit 205 also includes a geometry shader 209 that executes one or more geometry programs on each primitive. Geometry programs can be used to implement a variety of visual effects, including lighting and shading effects, and other processing that involves possible generation of new primitives. For instance, a geometry program can generate quads for point sprites from a single 3-D position. A geometry program can also generate multiple sets of clip space coordinates, for instance when rendering a primitive to all six sides of a cube map. Geometry programs can implement algorithms using a wide range of mathematical and logical operations on primitives and other data, and the programs can include conditional or branching execution paths and direct and indirect memory accesses.

In some embodiments, vertex shader 208 and geometry shader 209 are implemented using the same processing engine (or engines). Thus, at certain times, a given processing engine may operate as a vertex shader, receiving and executing vertex program instructions, and at other times the same processing engine may operates as a geometry shader, receiving and executing geometry program instructions.

In accordance with an embodiment of the present, the geometry programs executed by geometry shader 209 include a culling program that applies a visibility test (or multiple visibility tests) to the primitives. The visibility test is advantageously defined such that all primitives that fail (do not satisfy) the test would have no (or at most negligible) effect on the final image; it is not required that all primitives that satisfy the visibility tests actually be visible in the final rendered image. Primitives that satisfy the visibility test (or tests) are referred to herein as "potentially visible" while primitives that fail the test are referred to herein as "invisible."

Invisible primitives are advantageously discarded (culled) as early as possible in the rendering pipeline so that minimal time is consumed in processing data that has no effect on the final rendered image. "Discard," or "cull," as used herein, refers generally to any action that results in a downstream processing engine not processing a particular primitive. For instance, in some embodiments, invisible primitives are deleted from the list of primitives to be processed. In other embodiments, the primitives remain on the list, but a visibility flag associated with the primitive is set to a Boolean FALSE value; subsequent processing engines can check the visibility flag and ignore the primitive if the flag is set to FALSE.

In some embodiments, the culling program is advantageously executed after the vertex shader has computed the clip space coordinates for the vertices. As described below, the vertex processing path in some embodiments includes a first pass of the vertices through the vertex shader, during which clip space coordinates are computed; a first pass of the primitives through the geometry shader, during which culling is performed; and a second pass of the vertices that survive culling (i.e., any vertex that is in at least one visible primitive) through the vertex shader, during which other vertex attributes are computed.

The primitives (or vertices) that survive culling pass from vertex processing unit 205 to viewport and culling (VPC) unit 210. VPC unit 210 may further transform the primitives from clip space coordinates to screen space coordinates. The screen space can be defined using 3D inhomogeneous coordinates (X, Y, Z), where the (X, Y) coordinates correspond to locations in the fragment raster and Z is a depth coordinate along the viewing direction. Alternatively, the screen coordinates may be 2D inhomogeneous coordinates (X, Y) corresponding to the fragment raster for the image, with the Z (depth) coordinate of each vertex treated as an attribute. In some embodiments, both the clip space coordinates and the screen space coordinates are kept for each vertex, and downstream components may use either (or both) coordinate systems as desired. In some embodiments, VPC unit 210 may also transform some or all of the vertex attributes (e.g., by scaling attribute values by 1/w to create foreshortening in the image) as appropriate. In other embodiments, transformation to screen space coordinates and scaling of attributes may be performed in vertex processing unit 205.

In some embodiments, VPC unit 210 may perform additional culling operations that were not performed in geometry shader 209. As described below, numerous culling operations can be implemented in pipeline 200, and a particular division of labor between geometry shader 209 and VPC unit 210 is a matter of design choice. In some embodiments, culling operations that are defined in clip space coordinates are performed in geometry shader 209 while culling operations that are defined in screen space coordinates are performed in VPC unit 210. In addition, in some embodiments, VPC unit 210 may also clip primitives that are only partially visible, e.g., using conventional clipping algorithms.

Setup unit 215 uses the vertices of each primitive it receives to compute three edge equations for use by rasterizer unit 220 and also creates an ordered list of vertices to be used in defining a plane equation of the primitive. Rasterizer unit 220 converts each primitive into one or more fragments, where each fragment defines a set of one or more sample points for the rendered image. Fragment conversion generally involves determining which fragment locations are covered by each primitive; conventional scan-conversion algorithms or other algorithms may be implemented. Raster unit 220 provides fragment coverage information for each primitive to color assembly unit 225.

Color assembly unit 225 associates the primitives and coverage information received from rasterizer unit 220 with the attributes (e.g., color components, texture coordinates, surface normals) received from VPC unit 210 and generates plane equations (or other suitable equations) for some or all of the attributes in screen coordinates. These attribute equations are usable to interpolate a value for the attribute at any location within the primitive. These attribute equations are provided to a fragment processing unit 230. Fragment processing unit 230 uses the attribute equations (and other data as appropriate) to compute a fragment color. Fragment processing unit 230 is advantageously programmable and can be supplied with a fragment shader program.

As with vertex shader programs and geometry shader programs, rendering applications can specify the fragment program to be used for any given set of fragments. Fragment programs can be used to implement a variety of visual effects, including lighting and shading effects, reflections, texture mapping, procedural texture generation, and so on. Numerous examples of such "per-fragment" operations are known in the art and a detailed description is omitted as not being critical to understanding the present invention. Fragment shader programs can implement algorithms using a wide range of mathematical and logical operations on fragments and data, and the programs can include conditional or branching execution paths and direct and indirect memory accesses.

The colored fragments are then output to the raster operations unit 235. The raster operations unit 235 integrates the fragments output from the fragment processing unit 230 with the rendered image. Fragments can be blended or masked with fragments previously written to the rendered image. Depth buffers, alpha buffers, and stencil buffers can also be used to determine the contribution (if any) of each incoming fragment to the rendered image. The appropriate combination of each incoming fragment and any previously stored fragment value is written to a frame buffer, which can be located, e.g., in graphics memory 124 of FIG. 1, as part of the rendered image. The frame buffer can then be scanned out to a display device and/or subjected to further processing.

It will be appreciated that the rendering pipeline described herein is illustrative and that variations and modifications are possible. For instance, the pipeline may include different units from those shown and the sequence of processing events may be varied from that described herein. In some embodiments, multiple instances of a particular processing engine can operate in parallel. For instance, parallel fragment processors might process fragments in different sections of the image, parallel vertex processing units might process on different vertices or primitives, and so on.

In accordance with an embodiment of the present invention, at least some culling of invisible primitives is performed within vertex processing unit 205, e.g., by geometry shader 209. As is known in the art, a variety of visibility tests can be implemented, with different tests identifying different categories of invisible primitives.

Figure 3:
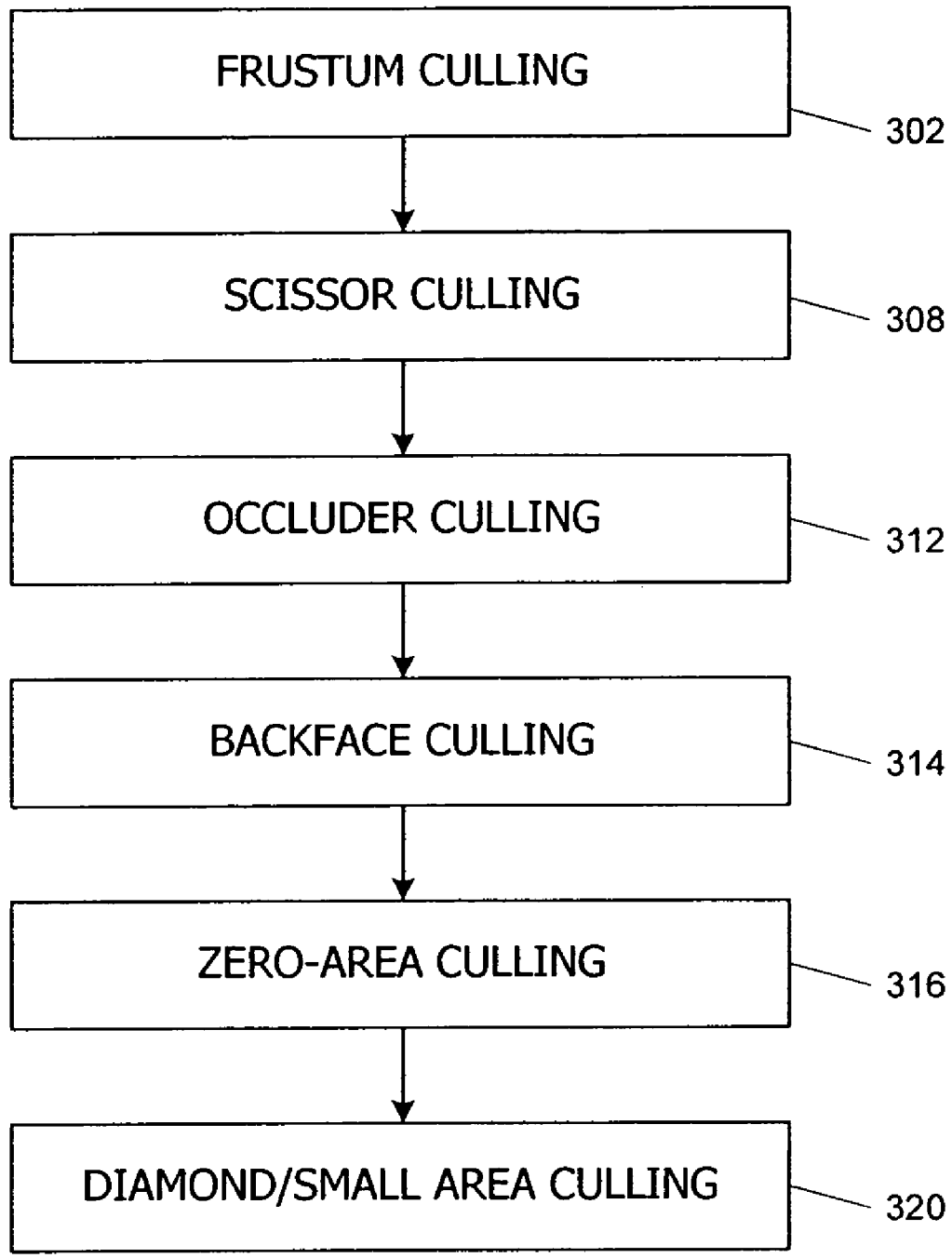
FIG. 3 is a flow diagram of a series of culling operations that can be performed by a geometry shader according to an embodiment of the present invention.

For example, FIG. 3 is a flow diagram of a series of culling operations, any or all of which might be performed by geometry shader 209 according to an embodiment of the present invention. Many of these operations are known in the art.

Figure 4A:
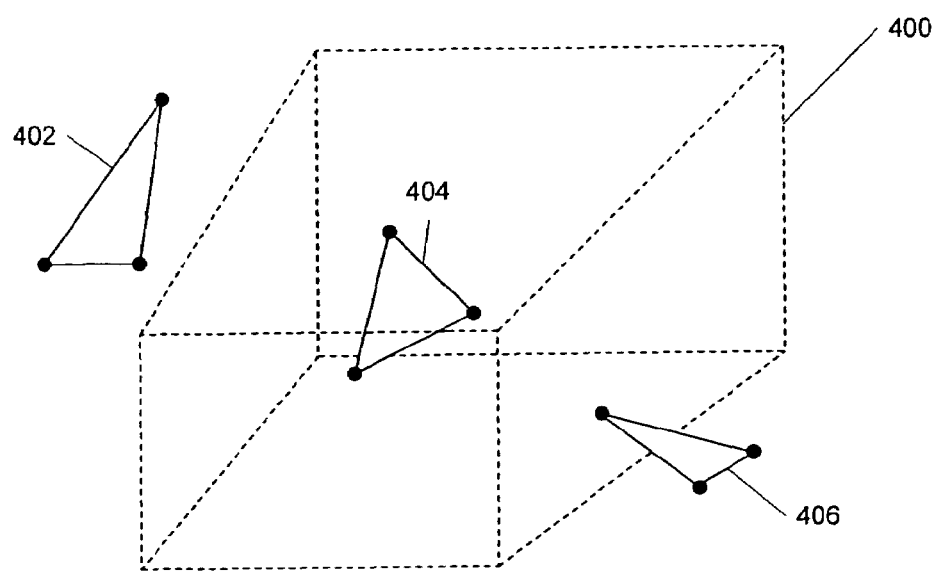
FIGS. 4A and 4B illustrate, respectively, frustum culling and diamond culling operations that can be performed by a geometry shader according to an embodiment of the present invention.

Frustum culling (step 302) involves defining a view frustum (i.e., a volume of space that will be represented in the final rendered image) in clip space coordinates and identifying as invisible any primitive that is entirely outside the view frustum. By way of example, FIG. 4A illustrates a view frustum 400 and representative primitives 402, 404, 406. Primitive 402, which is entirely outside frustum 400, is culled at step 302. Primitive 404, which is entirely inside frustum 400, is not culled at step 302. Primitive 406, which is partially inside frustum 400 and partially outside it, is advantageously not culled at step 302 since at least a portion of primitive 406 might be visible in the rendered image.

In one embodiment using homogeneous clip space coordinates, frustum culling compares the x and y clip-space coordinates of each vertex of a primitive with the w coordinate of that vertex. For example, if the same one of the expressions x<−w, y<−w, x>+w, or y>−w is true for all the vertices of a primitive, then the primitive is outside of the view frustum and can be discarded. Other frustum culling tests can also be defined. In some embodiments, the frustum used for culling is defined to be somewhat larger than the actual frustum used for rendering. This assures that no primitive that should be visible is inadvertently culled.

Scissor culling (step 308) discards primitives that are located entirely outside an application-defined scissor region. Typically, scissor culling at step 308 is performed in a similar manner to frustum culling at step 302, with the extents of the scissor region taking the place of the +/−w coordinate in evaluating the vertex x and y coordinates. In some embodiments, scissor culling is performed using screen space coordinates, and geometry shader 209 (or vertex shader 208) transforms clip space coordinates to screen space coordinates before performing scissor culling. Various transformations can be used; one such transformation scales the vertex coordinates by a screen scaling factor, divides each of the x and y coordinates of the vertex by the w coordinate, and adds a viewport bias to the x and y coordinates. In some embodiments, the screen-space transformation may also convert vertices to a discrete, fixed-point coordinate system used for subsequent primitive setup and rasterization.

In some embodiments, occluder-based culling (step 312) may also be performed. For purposes of culling, an occluder can be any object that is known to be large, opaque, and relatively near the viewpoint. In one embodiment, a bounding box of the occluder is defined (e.g., by the graphics driver) and provided to geometry shader 209. For purposes of culling, the bounding box is advantageously defined such that any primitive entirely within the bounding box is completely hidden by the occluder. During culling, the geometry shader can use the clip space or screen space coordinates of the occluder and each primitive to determine whether the primitive is entirely hidden behind the occluder. Primitives that are entirely hidden fail the visibility test and can be culled.

Backface culling is performed at step 314. Backface culling is advantageously performed in embodiments where primitives are defined as having distinct front and back sides, with the back sides of primitives being treated as invisible. A signed area of a primitive can be computed by calculating a vector product of the edges of the primitive in clip space or screen space as is known in the art. The sign of the signed area indicates whether the primitive is front-facing (i.e., oriented with its front side toward the viewer) or back-facing (i.e., oriented with its back side toward the viewer), and backface culling is based on the sign of the signed area. For instance, if back-facing primitives have signed area less than zero, then such primitives would be culled at step 314.

In addition, in some embodiments, primitives that are edge-on with respect to the viewer are also treated as being invisible (on the premise that primitives have no thickness) and are culled at step 316. In clip space or screen coordinates, primitives that are seen edge-on have signed area equal to zero, and zero-area culling removes these primitives. Further, in some embodiments, zero-area primitives can also be created when vertices that are incrementally different in clip space coordinates are converted the same value in a fixed-point screen coordinate system; such primitives can also be culled if zero-area culling is performed using screen space coordinates.

Figure 4B:
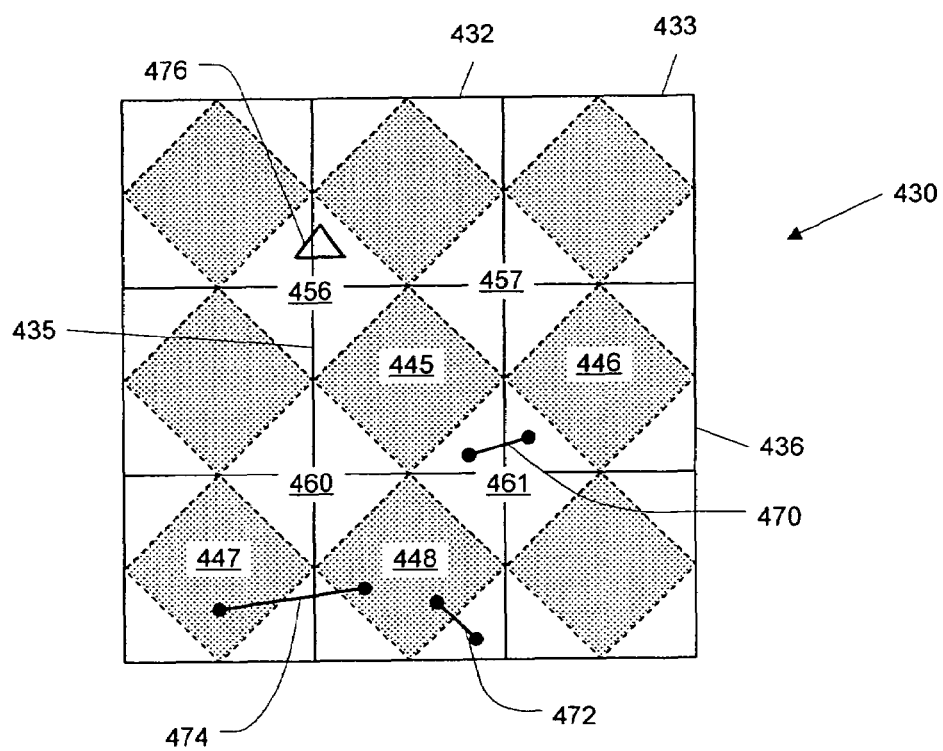

Diamond and/or small-area culling (step 320) culls small primitives that do not cover or hit any sample locations for any fragments. FIG. 4B illustrates diamond culling, in which the visibility test is based on "diamonds" defined on the pixel (or fragment) array. In this example, each pixel in an array 430 is inscribed with an "internal" diamond that covers the pixel center. For example, a pixel 435 (shown in FIG. 4B as a square) is inscribed with an internal diamond 445. Similarly, pixels 436 and 437 have respective internal diamonds 446 and 447. Each portion of the pixel outside its internal diamond is considered part of an "external" diamond, and external diamonds generally cross pixel boundaries. For instance, pixel 435 includes portions of external diamonds 456, 457, 460, and 461, and external diamond 457 includes portions of pixels 432, 433, 435 and 436.

Each vertex of a primitive is classified as an internal or external point, depending on whether it is located in an external diamond or an internal diamond, and some visibility tests are based on the classification of the vertices. In one embodiment, a line is culled if both of its vertices are in the same diamond. For example, line 470 would be culled because its vertices are both within external diamond 461. In another embodiment, a line is culled if one vertex is in an external diamond and another vertex is in a neighboring internal diamond. For example, line 472, which has a vertex in internal diamond 448 and another vertex in adjacent external diamond 465, would be culled. (Where lines are defined as having a direction, visibility may also depend on whether the line connects the internal vertex to the external vertex or vice versa, e.g., implementing the "diamond exit" rule of OpenGL.) In contrast, line 474 would not culled as it does not fail these visibility tests. In still another embodiment, small triangles (or other polygons) are culled if all of their vertices are in the same external diamond. For instance, all vertices of triangle 476 are in external diamond 456, and triangle 476 would be culled.

Other small-area culling algorithms may also be implemented; examples include bounding box culling, in which a primitive is identified as invisible if its bounding box does not cross any sampling locations in a fragment; coarse grid line snap culling, in which a line is identified as invisible if its vertices coalesce to a single point when converted to fixed point screen coordinates; and the like.

It will be appreciated that the culling sequence described herein is illustrative and that variations and modifications are possible. Steps described as sequential may be executed in parallel, order of steps may be varied, and steps may be modified or combined. Any or all of the above-described culling algorithms and/or other culling algorithms (including but not limited to conventional culling algorithms) may be implemented in geometry shader 209 in any combination. Algorithms not implemented in geometry shader 209 may be implemented elsewhere in pipeline 200 (e.g., in VPC unit 210 and/or setup unit 215), and some algorithms might not be used at all in a particular embodiment.

Figure 5:
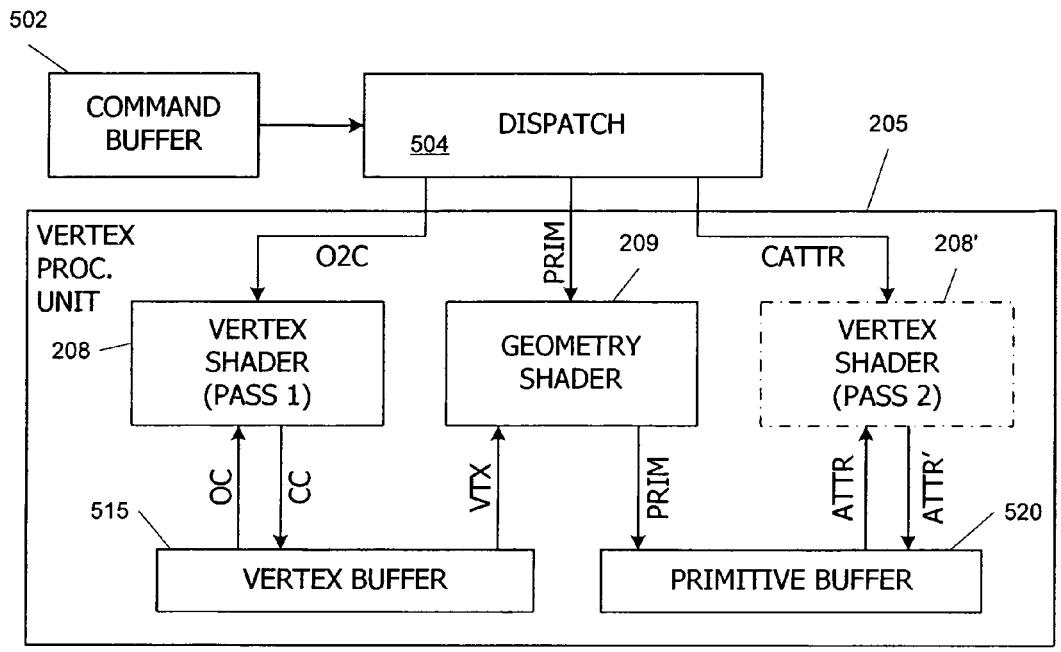
FIG. 5 is a block diagram representing a vertex processing path for a vertex processing unit according to one embodiment of the present invention.

An embodiment of vertex processing unit 205 configured to perform culling operations will now be described. FIG. 5 is a block diagram representing a vertex processing path for a vertex processing unit 205 according to one embodiment of the present invention. Commands are supplied from a command buffer 502 to a dispatch unit 504. Command buffer 502 is advantageously external to vertex processing unit 205 and may be external to GPU 122. For instance, in some embodiments, command buffer 502 is located in system memory 104 of FIG. 1, and rendering commands and data are written to command buffer 502 by a graphics driver program executing on CPU 102 in response to instructions received from a rendering application executing on CPU 102. GPU 122 in this embodiment includes a memory interface that reads the rendering commands and data via bus 113. Other implementations are also possible.

Referring again to FIG. 5, dispatch unit 504 is advantageously internal to the GPU. In some embodiments, dispatch unit 504 controls only vertex processing unit 205; in other embodiments, dispatch unit 504 controls all processing units in the rendering pipeline. In either case, when dispatch unit 504 receives a vertex shader command, it directs one or more corresponding instructions to vertex shader 208; when dispatch unit 504 receives a geometry shader command, it directs one or more corresponding instructions to geometry shader 209.

In FIG. 5, instructions to the vertex shader are represented generally as "O2C" and "CATTR." The O2C instruction instructs vertex shader to transform object coordinates of a vertex (or group of vertices) to clip-space coordinates, e.g., as described above. The CATTR instruction instructs vertex shader to compute an attribute value other than clip-space coordinates for a vertex (or group of vertices). In embodiments of the invention, the O2C and CATTR instructions are not required to be single instructions; multiple instructions may be dispatched to vertex shader 208 to control coordinate transformation and/or attribute computation.

As indicated in FIG. 5, the O2C instruction is executed by vertex shader 208 in a first pass, while the CATTR instruction is executed by vertex shader 208 in a second pass (represented by phantom box 208'). Although the first pass and second pass are shown as separate blocks in FIG. 5, the same processing engine(s) may be used to execute both passes. Further, while only two passes are shown, coordinate transformation and/or attribute computation may include any number of passes.

Similarly, instructions to the geometry shader are represented generally as "PRIM," which may be any instruction that instructs geometry shader 209 to perform a processing operation on a primitive. In particular, these operations include at least one culling operation, e.g., any or all of the operations described above with reference to FIG. 3. As with the O2C and CATTR instructions, a single PRIM instruction is not required; multiple instructions may be dispatched to geometry shader 209 to control culling and other primitive processing operations. In some embodiments, the PRIM instruction sequence is arranged such that culling is performed before other primitive processing operations; if a primitive fails a visibility test during culling, the remaining processing operations can be skipped.

A vertex buffer 515 stores information about each vertex including, e.g., an index, object coordinates (OC), clip-space coordinates (OC), and other attribute value(s) (ATTR). In some embodiments, when vertex data is initially loaded into buffer 515, not all of this information is present. For instance, a vertex may be loaded into buffer 515 before vertex shader 208 computes its clip space coordinates. Vertex buffer 515 advantageously provides enough space per vertex to load any data that is expected to be computed by vertex shader 208, and vertex shader 208 writes the clip space coordinates to vertex buffer 515. Vertex buffer 515 may be internal to the graphics processor or external to it (e.g., in graphics memory 124 of FIG. 1). In some embodiments, an external vertex buffer 515 is used in conjunction with an on-chip cache as is known in the art. A particular buffer implementation is not critical to the present invention.

In operation, a first pass through vertex shader 508 operates on vertices that have been loaded into a vertex buffer 515. Vertex buffer 515 may be internal to the graphics processor or external (e.g., in graphics memory 124 of FIG. 1). In some embodiments, an external vertex buffer 515 is used in conjunction with an on-chip cache as is known in the art. A particular vertex buffer is not critical to the present invention, and a detailed description has been omitted.

In operation, dispatch unit 205 first dispatches an O2C command to vertex shader 208. In response, vertex shader 208 reads object coordinates OC of a vertex from vertex buffer 515, computes the transformation of the object coordinates OC to clip-space coordinates CC and writes the clip-space coordinates CC to vertex buffer 515. In one embodiment, the coordinate transformation is performed in one pass through vertex shader 208; in other embodiments, multiple passes may be used and at least some attributes other than clip-space coordinates can be computed.

Next, dispatch unit 205 dispatches a PRIM command to geometry shader 209. In response to the PRIM command, geometry shader 209 reads vertices from vertex buffer 515 and assembles the vertices into primitives. Geometry shader 209 may perform additional computations (e.g., modifying attributes of a primitive's vertices and the like). After processing a primitive, geometry shader 209 writes the primitives to a primitive buffer 520. For each primitive written by geometry shader 209, primitive buffer 520 in this embodiment includes all of the vertices of the primitive (including all of their attributes); the same vertex may appear in buffer 520 multiple times if the vertex is part of multiple primitives.

Before writing a primitive to primitive buffer 520, geometry shader 209 performs at least one visibility test on the primitive. The visibility test may be defined by a PRIM command dispatched to geometry shader 209. If the primitive fails the visibility test (or fails any one of multiple visibility tests), it is culled. In this embodiment, primitives that are culled are not written to primitive buffer 520. Thus, culling in geometry shader 209 can reduce the number of vertices, including the number of duplicate vertices, in primitive buffer 520. In addition, geometry shader 209 can be configured to perform culling before other per-primitive operations and to perform the other operations only if the primitive is not culled, thereby reducing the processing load on geometry shader 209 to the extent that primitives are being culled.

Vertex shader 208 in its second pass 208' (and any subsequent passes) is configured to read vertex data from primitive buffer 520 rather than vertex buffer 515. During this second pass, vertex shader 208' computes attribute values. This process may include reading existing attribute values (ATTR) for vertices from primitive buffer 520 and/or writing new or modified attribute values (ATTR') back to primitive buffer 520. Since the same vertex can appear multiple times in primitive buffer 520, in some embodiments one vertex might be processed multiple times in second pass 208'. In some embodiments, attribute computation in second pass 208' includes recomputing the clip space coordinates; in other embodiments, the clip space coordinates CC from the first pass 208 are preserved. In any case, to the extent that culling in geometry shader 209 reduces the number of vertices, the processing load on the second pass of vertex shader 208' is reduced.

When vertex processing is complete, downstream units (e.g., VPC unit 210 of FIG. 2) extract vertex information from primitive buffer 520. Again, to the extent that culling in geometry shader 209 reduces the number of vertices in primitive buffer 520, the amount of data that is transferred to the downstream units is also reduced.

It will be appreciated that the vertex processing unit described herein is illustrative and that variations and modifications are possible. For example, in one embodiment, primitive buffer 520 is replaced with an index list that identifies the indices of vertices in each primitive that survived culling by geometry shader 209, and second-pass vertex shader 208' uses the index list to determine which vertices from vertex buffer 515 should be processed. Where an index list is used to represent primitives, second-pass vertex shader 208' may maintain information as to which vertices have already been processed and may use this information in order to avoid processing a vertex multiple times. For instance, vertex buffer 515 may provide space for a "done" flag that is set by second-pass vertex shader 208' when it finishes processing a vertex. By checking the "done" flag before processing the next vertex identified in the index list, second-pass vertex shader 208' can determine whether that vertex has already been processed.

Figure 6:
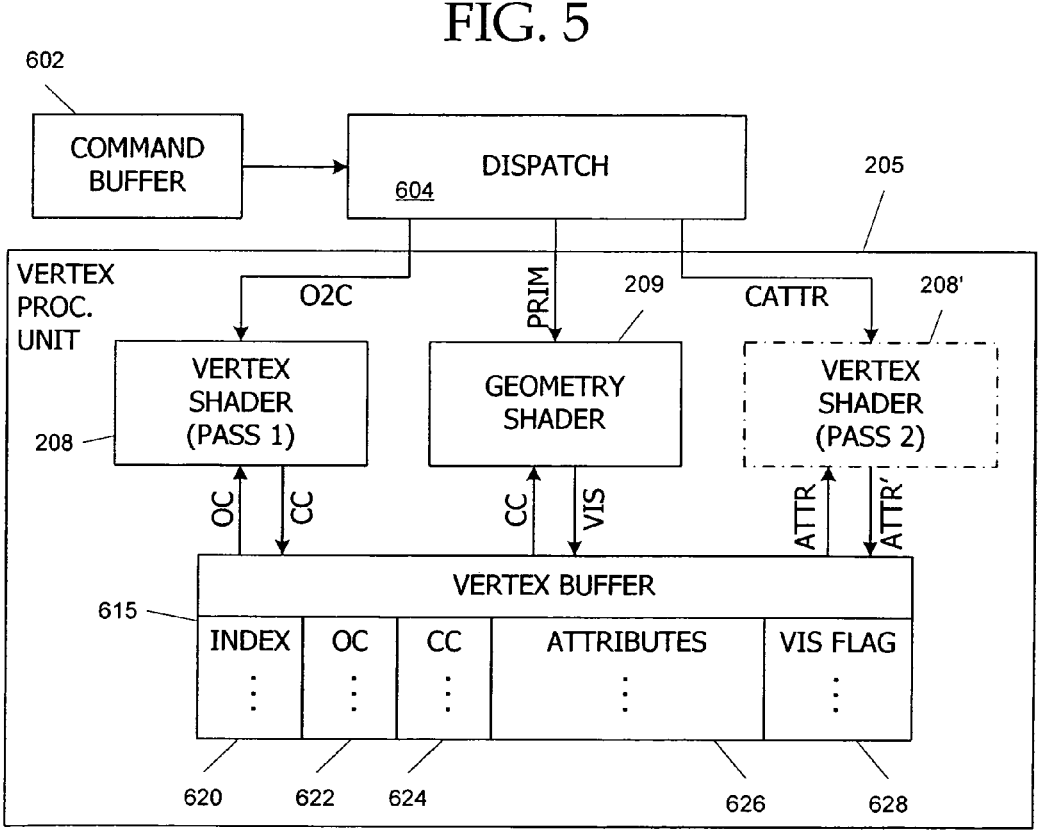
FIG. 6 illustrates a vertex processing path for a vertex processing unit according to an alternative embodiment of the present invention.

FIG. 6 illustrates a vertex processing path for vertex processing unit 205' according to an alternative embodiment of the present invention. Similarly to the embodiment of FIG. 5, two passes for vertex shader 208 are shown as block 208 and phantom block 208'. Geometry shader 209 operates between the first and second passes through vertex shader 208.

In this embodiment, vertex shader 208 and geometry shader 209 read from and write back to a common vertex buffer 615. Vertex buffer 615 includes a visibility flag 628 for each vertex, in addition to an index value 620, object coordinates (OC) 622, clip-space coordinates (CC) 624 and other attributes (ATTR) 626. Initially, the visibility flag 628 for each vertex is set to a Boolean FALSE value, and during its first pass, vertex shader 208 ignores the visibility flag. If geometry shader 209 determines that a primitive satisfies all of the visibility tests (i.e., the primitive is potentially visible), then geometry shader 209 sets the visibility flag for each vertex in that primitive to a Boolean TRUE value; if the primitive fails a visibility test, its visibility flag is not modified. Accordingly, vertices that are in at least one potentially visible primitive will have their visibility flags set to TRUE, while the visibility flags for vertices that are not in any potentially visible primitives will remain set to FALSE.

Before processing a vertex, second-pass vertex shader 208' checks the visibility flag for that vertex and processes the vertex only if the visibility flag is set to TRUE. Vertices that are not in any visible primitive may remain in buffer 615, but they are not processed by vertex shader 208'. Further, if geometry shader 209 provides a culled list of primitives to downstream components of the pipeline, vertices that are not in any potentially visible primitive will not be transferred to those components.

Thus, in the embodiments described herein, at least some culling of invisible primitives is performed by a geometry shader, which is a primitive-aware processing engine located in a vertex processing unit of a rendering pipeline of a graphics processor. Culling at this early stage in the pipeline reduces the number of vertices and/or primitives that are transferred to downstream processing units, improving throughput of the processor. Further, where the vertex processing unit can be configured such that culling precedes at least some of the per-vertex and/or per-primitive computations, the processing burden within the vertex processing section can be reduced.

As noted above, in some embodiments of the invention, a graphics driver executing on CPU 102 of FIG. 1 generates commands defining vertex shader programs and geometry shader programs in response to instructions received from a rendering application that also executes on CPU 102. In some embodiments, the instructions received by the driver include instructions defining culling operations to be performed by the geometry shader. Further, the application may define a single vertex shader program, and the driver may be configured to separate that program into commands related to coordinate transformation and commands related to other attribute computations, then deliver the commands in the desired sequence to GPU 122.

In other embodiments, culling may be handled by the driver and transparently to the application. In some of these embodiments, GPU 122 provides feedback information that the driver program can use to determine whether and to what extent culling operations should be performed in the vertex processing unit. For instance, GPU 122 may include hardware counters that track the number of primitives sent to the geometry shader and the number that survive culling. Count values from these counters can be reported back to the driver, which uses the information to determine whether (and in some instances to what extent) vertex-stage culling is improving graphics processor performance for a particular application. Based on this information, the driver can determine whether to continue using a current set of culling instructions or to change the instructions to optimize performance.

While the invention has been described with respect to specific embodiments, one skilled in the art will recognize that numerous modifications are possible. For instance, while the embodiments described herein make use of a programmable geometry shader to perform culling, other embodiments might not include a geometry shader. Any primitive-aware processing engine capable of applying a visibility test to a primitive and culling primitives that fail the test can be introduced into the vertex processing unit; such a culling engine might or might not be fully programmable or configurable for different culling operations.

As noted above, multiple instances of a particular processing engine may operate in parallel. In one such embodiment, multiple geometry shaders (or other primitive processing engines) can operate in parallel in a "chunking" architecture, in which each instance of the geometry shader handles a different portion (e.g., quadrant) of the display area. In this embodiments, each geometry shader might cull the same set of primitives using, e.g., different frustum boundaries. If the downstream engines use the same "chunks" to divide the primitives, each primitive is processed only in the chunk(s) in which it is visible. Alternatively, parallel geometry shaders can each handle the entire display area, with each primitive being processed by one or another of the geometry shaders rather than by multiple instances.

Multi-pass capability is also not required in either the vertex shader or the geometry shader. In some embodiments, different processing engines can be provided within the same vertex processing unit to implement coordinate transformation, culling, and computation of vertex attributes in a single pass through each engine. Alternatively, if the vertex shader program is arranged such that the coordinate transformation is executed first, a second pass might not be used. In still other embodiments, culling can be implemented in the vertex shader itself. For instance, a first vertex provided to the vertex shader can include, as attributes, the coordinates of other ("neighbor") vertices in the same primitive as the first vertex, and the vertex shader can be programmed to use these attributes to perform frustum culling and/or other types of culling operations. If the neighbor vertices are also supplied separately to the vertex shader (with coordinates of their neighbor vertices as attributes), the same primitive could be culled (or not culled) multiple times.

Further, although various processing engines are described herein as being programmable, this is not required. In some alternative embodiments, the vertex processing section of the pipeline can include three (or more) sequential processing engines: one engine that transforms vertices from object coordinates to clip-space coordinates, followed by an engine that performs visibility testing on a per-primitive basis, followed by at least one vertex shader engine. All, some, or none of these engines might be programmable or configurable to varying degrees. In still other embodiments, as mentioned above, the same programmable processing hardware can be used at different times as both vertex shader and geometry shader by supplying suitable streams of program instructions.

While the present invention has been described with reference to specific hardware and software components, those skilled in the art will appreciate that different combinations of hardware and/or software components may also be used, and that particular operations described as being implemented in hardware might also be implemented in software or vice versa.

Thus, although the invention has been described with respect to specific embodiments, it will be appreciated that the invention is intended to cover all modifications and equivalents within the scope of the following claims.

What is claimed is:

1. A graphics processor comprising:
a vertex processing unit coupled to receive data for a plurality of vertices, each vertex being associated with at least one of a plurality of primitives in a scene to be rendered,
the vertex processing unit being configured to apply a visibility test to each of the plurality of primitives and to cull primitives that fail the visibility test from a list of primitives to be processed, the vertex processing unit comprising:
a programmable vertex shader configured to compute one or more per-vertex attribute values for a vertex; and
a primitive processing engine configured to apply the visibility test and to cull each of the primitives that fails the visibility test from the list of primitives to be processed, wherein the visibility test is defined by reference to clip space coordinates of vertices of a primitive, wherein the visibility test is a diamond visibility test, wherein each pixel has an associated internal region having a diamond shape that covers a center of the pixel, and wherein if a primitive intersects the internal region of more than one pixel, the primitive is visible and is not culled;
wherein the vertex shader is programmed to compute clip space coordinates for the vertices during a first pass executed prior to applying the visibility test and to compute at least one other per-vertex attribute value during a second pass executed subsequently to culling the primitives that fail the visibility test; and
a downstream processing unit coupled to receive the primitives that are not culled from the vertex processing unit and configured to generate pixel data from the received primitives,
wherein vertices of primitives that fail the visibility test are not received by the downstream processing unit.

2. The graphics processor of claim 1 wherein the vertex processing unit is further configured to compute at least one per-vertex attribute value for each vertex that is associated with at least one primitive that is not culled.

3. The graphics processor of claim 1 wherein the primitive processing engine is a programmable geometry shader.

4. The graphics processor of claim 3 wherein the geometry shader is programmed to read vertices of primitives from a vertex buffer and to write vertices of primitives that are not culled to a primitive buffer.

5. The graphics processor of claim 4 wherein the vertex shader is further configured to read the vertices from the primitive buffer and to compute at least one per-vertex attribute value for each vertex read from the primitive buffer.

6. The graphics processor of claim 3 wherein the geometry shader is further configured to read vertices of primitives from a vertex buffer and to set a visibility flag in the vertex buffer for each of the vertices of each primitive that is not culled.

7. The graphics processor of claim 6 wherein the vertex shader is further configured to compute at least one of the per-vertex attribute values for a vertex only if the visibility flag for that vertex has been set.

8. The graphics processor of claim 3 wherein the geometry shader is further configured to read the vertices of the primitives from a vertex buffer and to generate a list of identifiers of the vertices of each primitive that is not culled.

9. The graphics processor of claim 8 wherein the vertex shader is further configured to use the list of identifiers to select vertices from the vertex buffer for which a per-vertex attribute is to be computed.

10. A method of processing vertex data, the method comprising:

receiving, at a vertex processing unit of a graphics processor, vertex data for a plurality of vertices, each vertex being associated with at least one of a plurality of primitives in a scene to be rendered;

applying a visibility test to each of the plurality of primitives, wherein the visibility test is a diamond visibility test, wherein each pixel has an associated internal region having a diamond shape that covers a center of the pixel, and wherein if a primitive intersects the internal region of more than one pixel, the primitive is visible and is not culled;

culling each primitive that fails the visibility test;

subsequently to the act of culling, computing at least one per-vertex attribute value for each vertex that is associated with at least one primitive that is not culled; and subsequently to the act of computing, propagating the vertices of each primitive that is not culled during the act of culling from the vertex processing unit to a downstream processing unit of the graphics processor.

11. The method of claim 10 wherein the acts of computing the clip-space coordinates and computing the attribute value are performed by a programmable vertex shader in the vertex processing unit.

12. The method of claim 11 wherein the acts of applying the visibility test and culling each primitive that fails the visibility test are performed by a programmable geometry shader in the vertex processing unit.

13. The method of claim 10 wherein the act of computing at least one attribute value is performed once per vertex regardless of the number of primitives with which the vertex is associated.

14. The method of claim 10 wherein the act of computing the at least one attribute is performed by a programmable vertex shader in the vertex processing unit.

15. The method of claim 10 further comprising:

prior to the act of applying the visibility test, computing clip-space coordinates for each vertex, wherein the visibility test is based at least in part on the clip-space coordinates.

16. The method of claim 15 wherein the visibility test is based at least in part on a view frustum defined in the clip space.

17. The method of claim 15 wherein the visibility test is based at least in part on an orientation of the primitive in the clip space.

18. The method of claim 15 wherein the visibility test is based at least in part on a signed area of the primitive in the clip-space coordinates.

19. The method of claim 10 further comprising:

in the downstream processing unit, performing a further culling operation on each primitive propagated from the vertex processing unit.

* * * * *